(12) United States Patent
Johnson

(10) Patent No.: US 9,668,454 B2
(45) Date of Patent: Jun. 6, 2017

(54) LIVESTOCK FEEDING DEVICE

(71) Applicant: Creative Horse LLC, West Fargo, ND (US)

(72) Inventor: Julie Johnson, West Fargo, ND (US)

(73) Assignee: Creative Horse, LLC, West Fargo, ND (US)

( * ) Notice: Subject to any disclaimer, the term of this patent is extended or adjusted under 35 U.S.C. 154(b) by 283 days.

(21) Appl. No.: 14/326,172

(22) Filed: Jul. 8, 2014

(65) Prior Publication Data

US 2016/0007562 A1  Jan. 14, 2016

(51) Int. Cl.
*A01K 5/01* (2006.01)

(52) U.S. Cl.
CPC ..................... *A01K 5/01* (2013.01)

(58) Field of Classification Search
CPC .......... A01K 5/01; A01K 1/10; A01K 5/0107; A01K 1/105; A01K 5/00; A01D 87/127
USPC ............... 119/60, 61.1, 61.2, 51.03
See application file for complete search history.

(56) References Cited

U.S. PATENT DOCUMENTS

| | | | | |
|---|---|---|---|---|
| 195,351 A * | 9/1877 | Crabb | ...................... | A01K 5/01 119/60 |
| 376,529 A * | 1/1888 | Kline | ...................... | A01K 5/01 119/60 |
| 387,821 A * | 8/1888 | Smith | ..................... | A01K 5/008 119/65 |
| 564,788 A * | 7/1896 | Hermany et al. | ......... | A01K 1/10 119/60 |
| 727,925 A * | 5/1903 | Faulkner | ................... | A01K 5/01 119/58 |
| 763,951 A * | 7/1904 | Bethea | .................. | A01K 39/014 119/60 |
| 1,075,758 A * | 10/1913 | Burnham | ................ | A01K 5/008 119/65 |
| 1,090,286 A * | 3/1914 | Crowell | .................... | A01K 1/10 119/60 |
| 1,146,108 A * | 7/1915 | Sharp | ........................ | A01K 1/10 119/60 |
| 5,887,544 A * | 3/1999 | Popelier | ................... | A01K 5/01 119/61.54 |
| 6,431,117 B1 * | 8/2002 | Rauch | ....................... | A01K 5/01 119/58 |
| 7,753,000 B1 * | 7/2010 | Turner | ...................... | A01K 5/01 119/57 |
| 7,895,974 B2 * | 3/2011 | Brickell | .................... | A01K 1/10 119/60 |
| 9,125,382 B1 * | 9/2015 | Lembke | ................ | A01K 39/014 |

(Continued)

*Primary Examiner* — Son T Nguyen
(74) *Attorney, Agent, or Firm* — Schmeiser, Olsen & Watts LLP

(57) ABSTRACT

A livestock feeding device is provided. The feeding device has a body member including a base portion, side walls and a top portion. The device also includes an inner volume defined between the side walls, the base portion and the top portion, wherein the inner volume receives hay for feeding livestock. The feeding device includes an aperture extending through the top portion to provide feeding access to the inner volume. The feeding device also comprises an consumption restriction plate for metering the amount of hay eaten by livestock, wherein the consumption restriction plate is adjustable up and down within the inner volume in response to the amount of hay within the inner volume.

18 Claims, 6 Drawing Sheets

(56) References Cited

U.S. PATENT DOCUMENTS

2015/0359190 A1\* 12/2015 Chylinski ............ A01K 15/025
　　　　　　　　　　　　　　　　　　　　　　119/60

\* cited by examiner

LIVESTOCK FEEDING DEVICE

BACKGROUND OF THE INVENTION

Technical Field

This invention relates generally to a feeding device and more particularly to a feeding device for livestock, and horses in particular.

State of the Art

Certain livestock, such as cows, consume a large amount of food and can store the same and digest the food throughout the day to provide nourishment. Other livestock, such as horses, do not have a large amount of storage for food, and therefore cannot eat a lot of food all at once and digest throughout the day. Horses are more so grazing livestock that eat small amounts of food all day, wherein the amount of food is able to be digested and processed within the stomach and digestive tract.

Conventional feeding devices do not provide this type of feeding for horses and like grazing livestock, such as llamas, goats, alpaca, and miniature livestock such as miniature cattle. They do not have the ability to restrict the amount of food that livestock can eat at one time, and therefore do not have the ability to mimic optimal eating habits, in particular, for horses.

Accordingly, there is a need in the field of feeding devices for an improved feeding device.

SUMMARY OF EMBDOIMENTS OF THE INVENTION

The present invention relates to a feeding device for livestock, wherein the feeding device is capable of simulating natural foraging. Hay or other types of forage livestock may graze on can be retained within the feeding device and provide access to the hay or other food through a consumption restriction plate.

An embodiment includes a livestock feeding device. The feeding device comprises a body member comprising a base portion, side walls and a top portion. The device also comprises an inner volume defined between the side walls, the base portion and the top portion, wherein the inner volume receives hay for feeding livestock and an aperture extending through the top portion to provide feeding access to the inner volume. The feeding device also comprises a consumption restriction plate member for metering the amount of hay eaten by livestock, wherein the consumption restriction plate member is adjustable up and down within the inner volume in response to the amount of hay within the inner volume.

Another embodiment includes a livestock feeding device. The feeding device comprises a body member comprising a base portion, four side walls and a top portion, wherein the body member is a frusto-pyramidal shape. The device also comprises an inner volume defined between the side walls, the base portion and the top portion, wherein the inner volume receives hay for feeding livestock and an aperture extending through the top portion to provide feeding access to the inner volume. The feeding device also comprises a consumption restriction plate member for metering the amount of hay eaten by livestock, wherein the consumption restriction plate member is adjustable up and down within the inner volume in response to the amount of hay within the inner volume.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to feeding device for livestock, wherein the feeding device is capable of simulating natural foraging. Hay or other types of food livestock may graze on can be retained within the feeding device and provide access to the hay or other food through a consumption restriction plate. As used herein, "hay" may refer to all types of hay, including, but not limited to, forages such as peanut, bermuda grass, timothy, orchard, brohme, alfalfa and the like.

Figure 6:
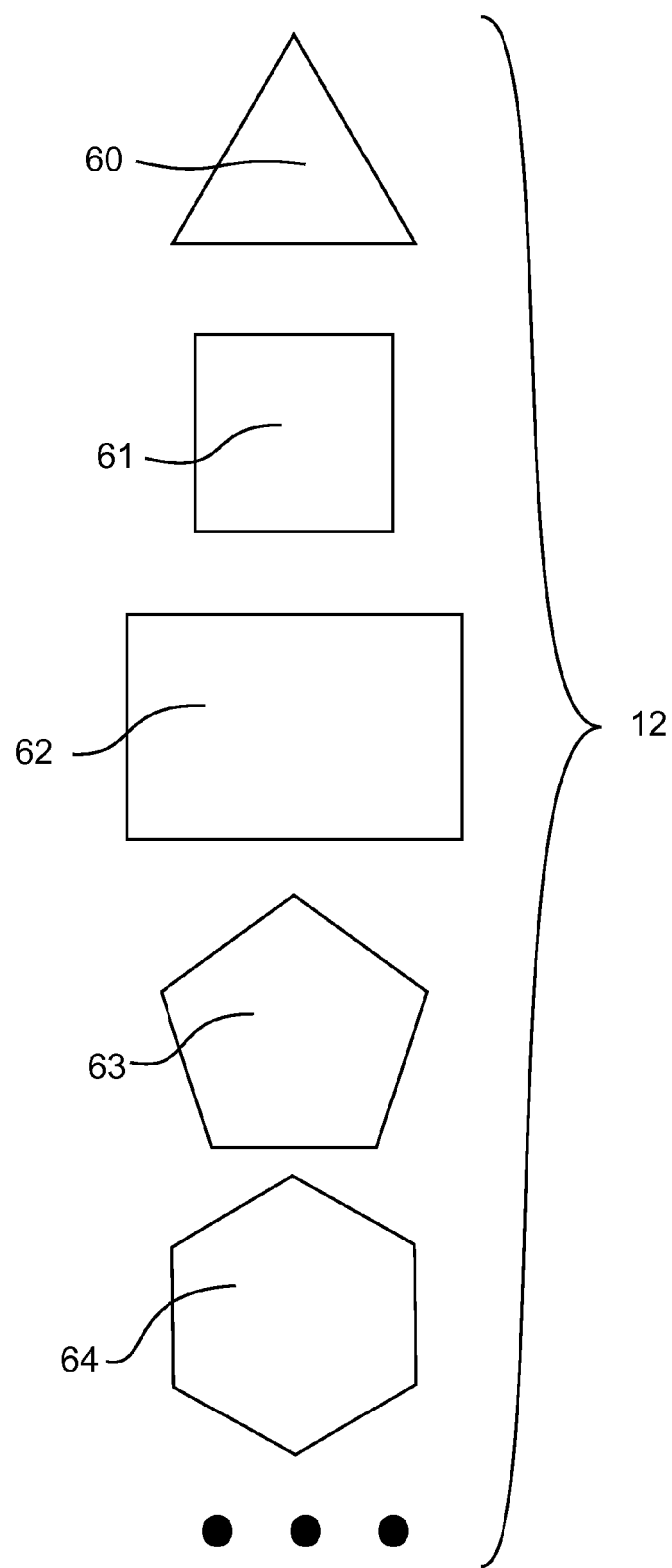
FIG. 6 is a top view of cross-sectional shapes of a feeding device.

Referring to the drawings, FIGS. 1-4 depict an embodiment of a livestock feeding device 10. The feeding device 10 comprises a body member 12 formed of a side walls 14, a base portion 16, a top portion 18 and a consumption restriction plate member 30. In some embodiments the body member 12 may have a frusto-pyramidal shape. It should be understood that while the body member is shown as a frusto-pyramidal shape, other shapes have been contemplated; particularly shapes wherein the base has a larger area than the top portion in order to provide greater stability and resistance to tipping. For example, as shown in FIG. 6, the cross-sectional shape of the body member 12 may be triangular 60, square 61, rectangular 62, pentagonal 63, hexagonal 64, and the like, such as any rectilinear shape. Further, the feeder is easily moveable and allows livestock to forage from the feeder anywhere; therefore, not needing to be under a covered shelter or attached to a fence, tree or post.

In some embodiments, the edges of the feeding device that are exposed are rolled edges in order to protect feeding livestock. The lack of sharp edges reduces the ability for the livestock to be injured during feeding.

An inner volume 40 is defined between side walls 14, the base portion and the top portion 18. The inner volume 40 receives hay within the body member. Access to the inner volume 40 may occur through the base portion 16 of the body member 12. The base portion 16 may include a moveable member 17. The moveable member 17 may be moved between an opened and closed position, wherein the open position provides access to the inner volume 40 of the body member 12 through the base portion 16 and the closed position prevents access to the inner volume 40 through the base portion 16. When the moveable member 17 is in the open position, hay may be inserted within the inner volume 40 of the feeding device 10. Once hay is received in the inner volume 40, the moveable member 17 may be moved into the closed position. In some embodiments, the moveable member 17 is slideable through slot 19 formed in a side wall 14 adjacent the base portion 16. In this embodiment, moveable member 17 is slideable along direction arrow 52 in order to move between the open and closed positions.

Figure 1:
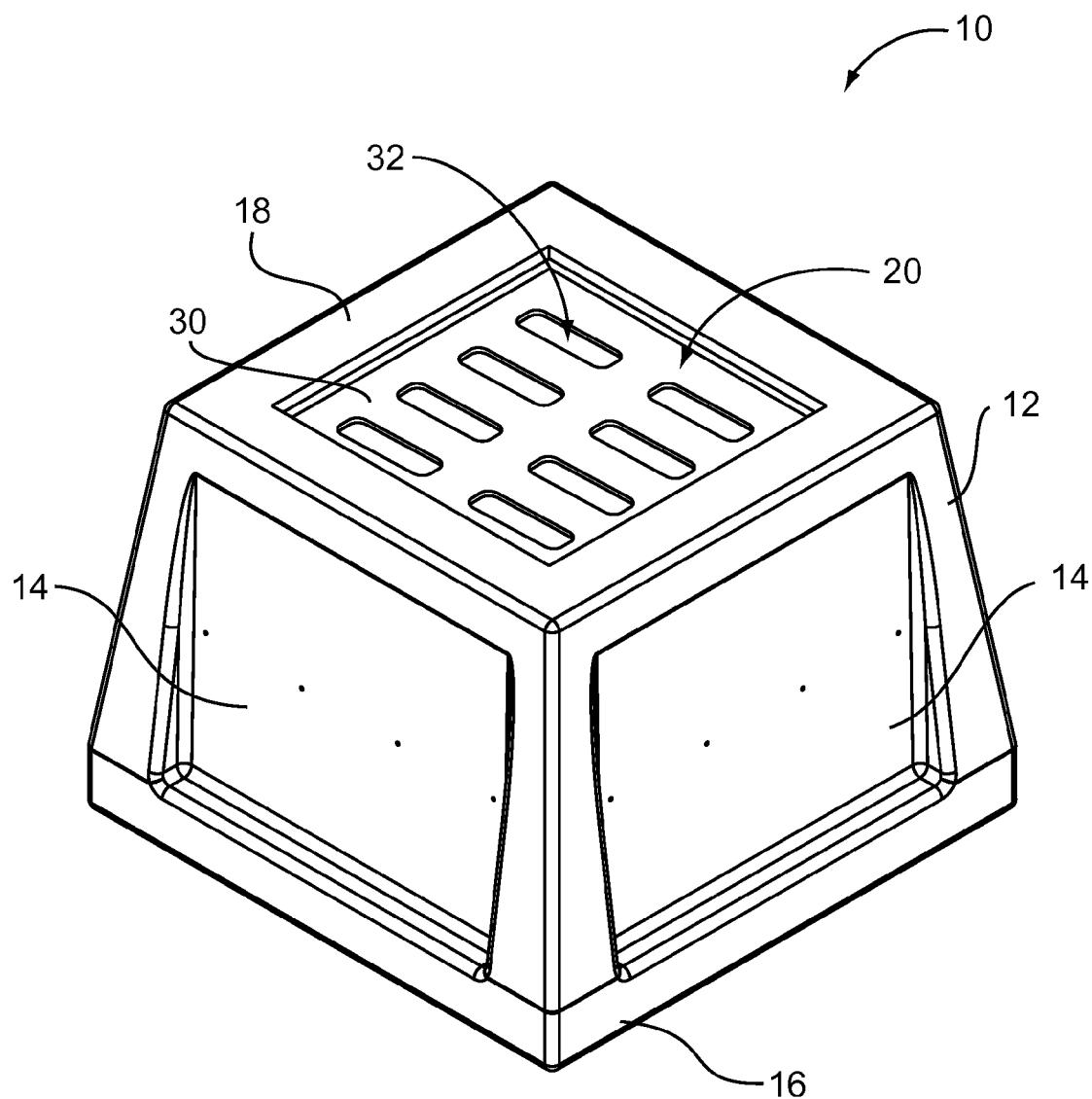
FIG. 1 is a perspective view of an feeding device.
Figure 2:
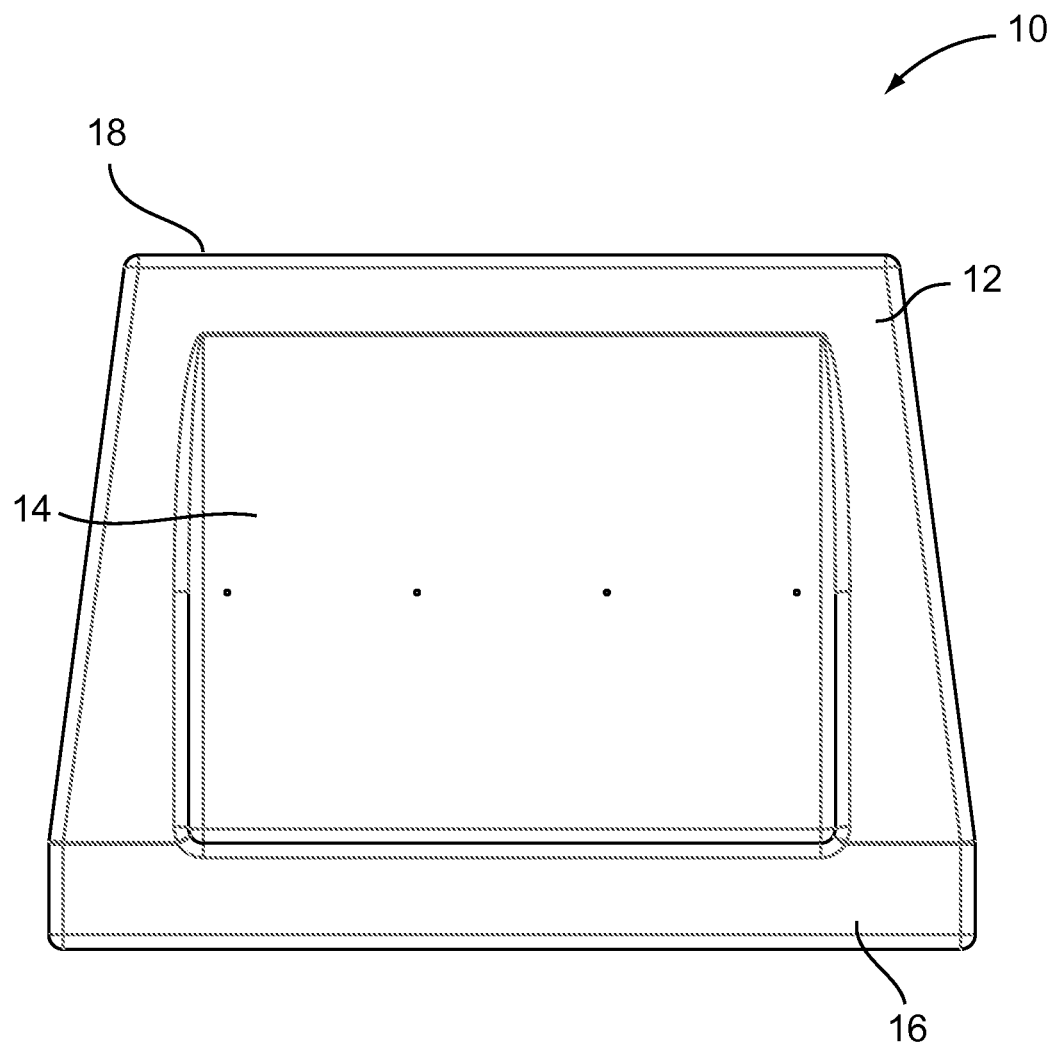
FIG. 2 is a side view of a feeding device.
Figure 3:
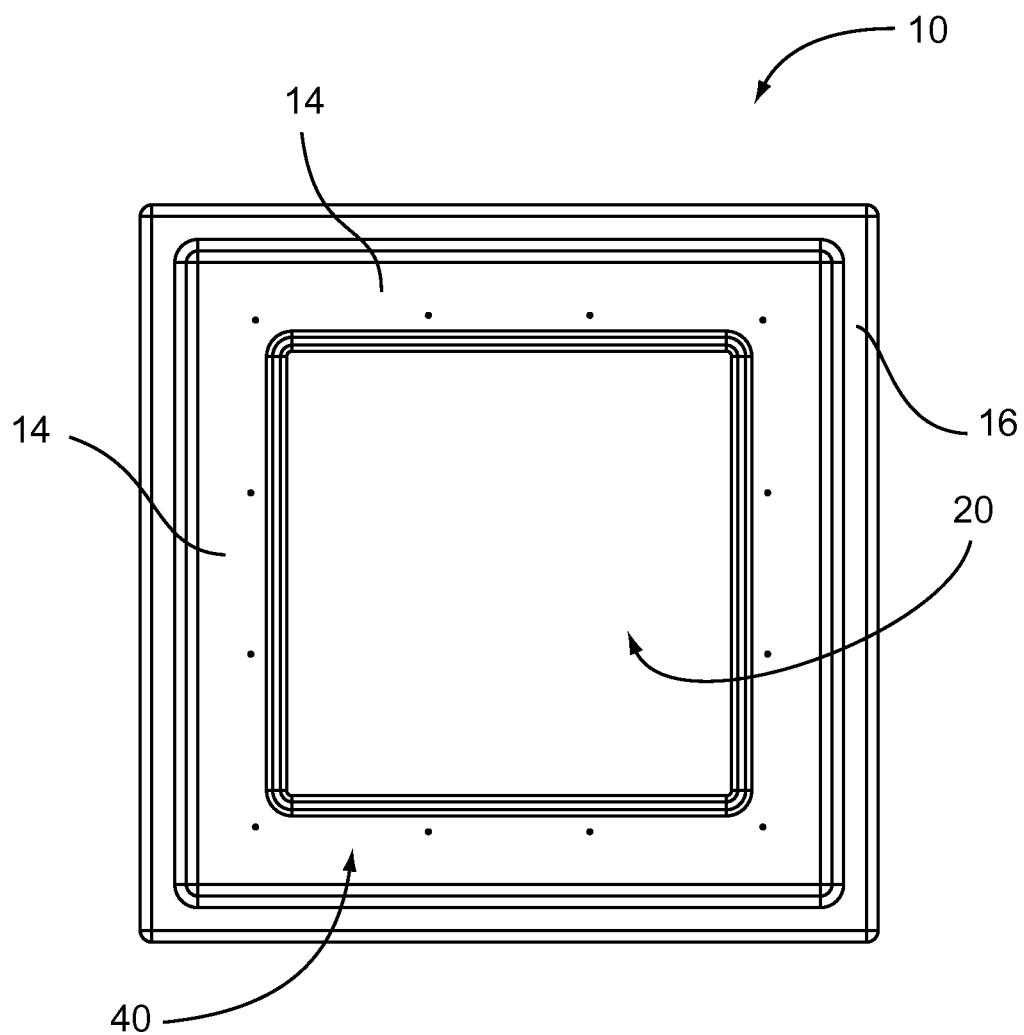
FIG. 3 is a bottom view of a feeding device.
Figure 4:
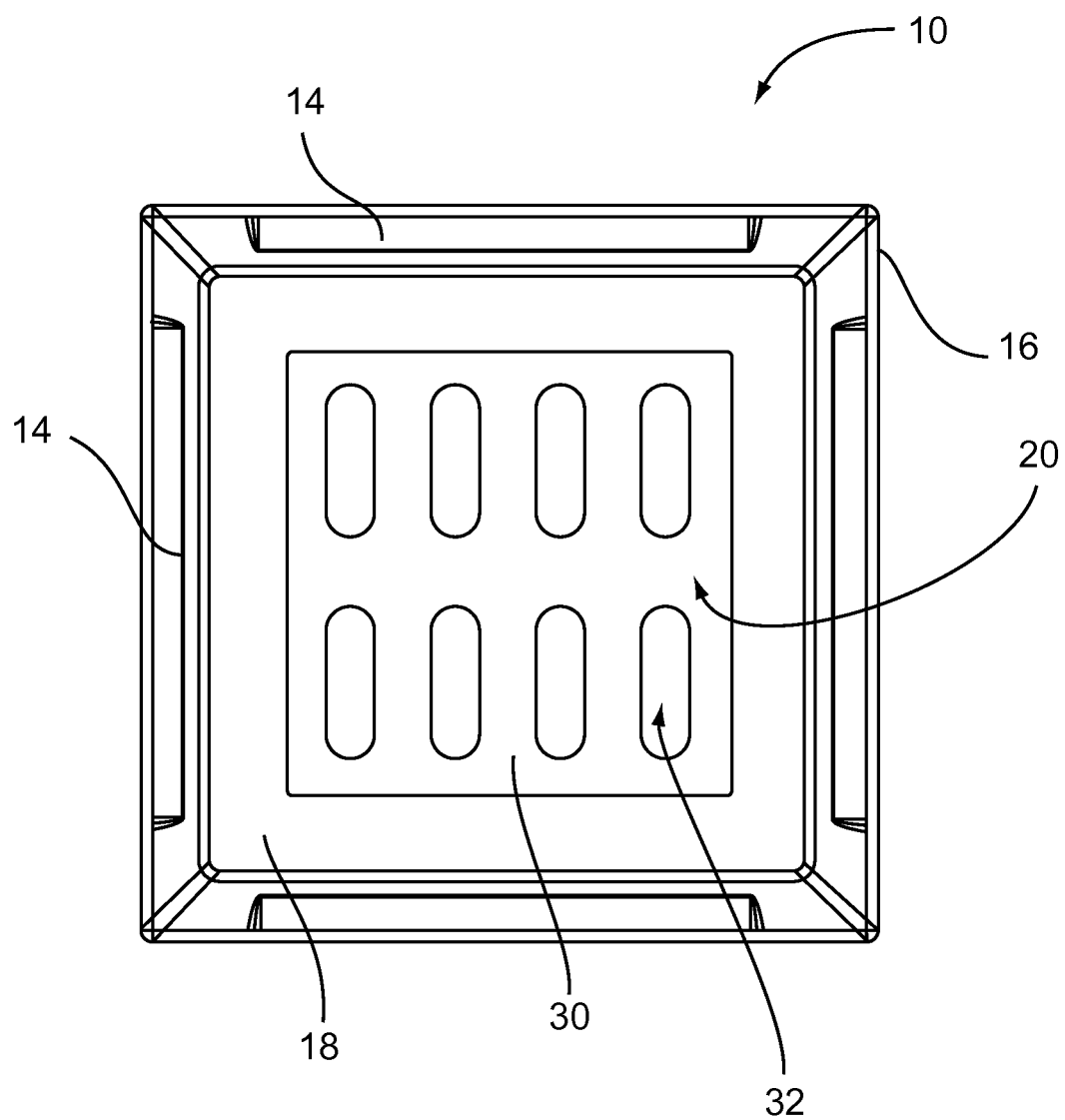
FIG. 4 is a top view of a feeding device.
Figure 5:
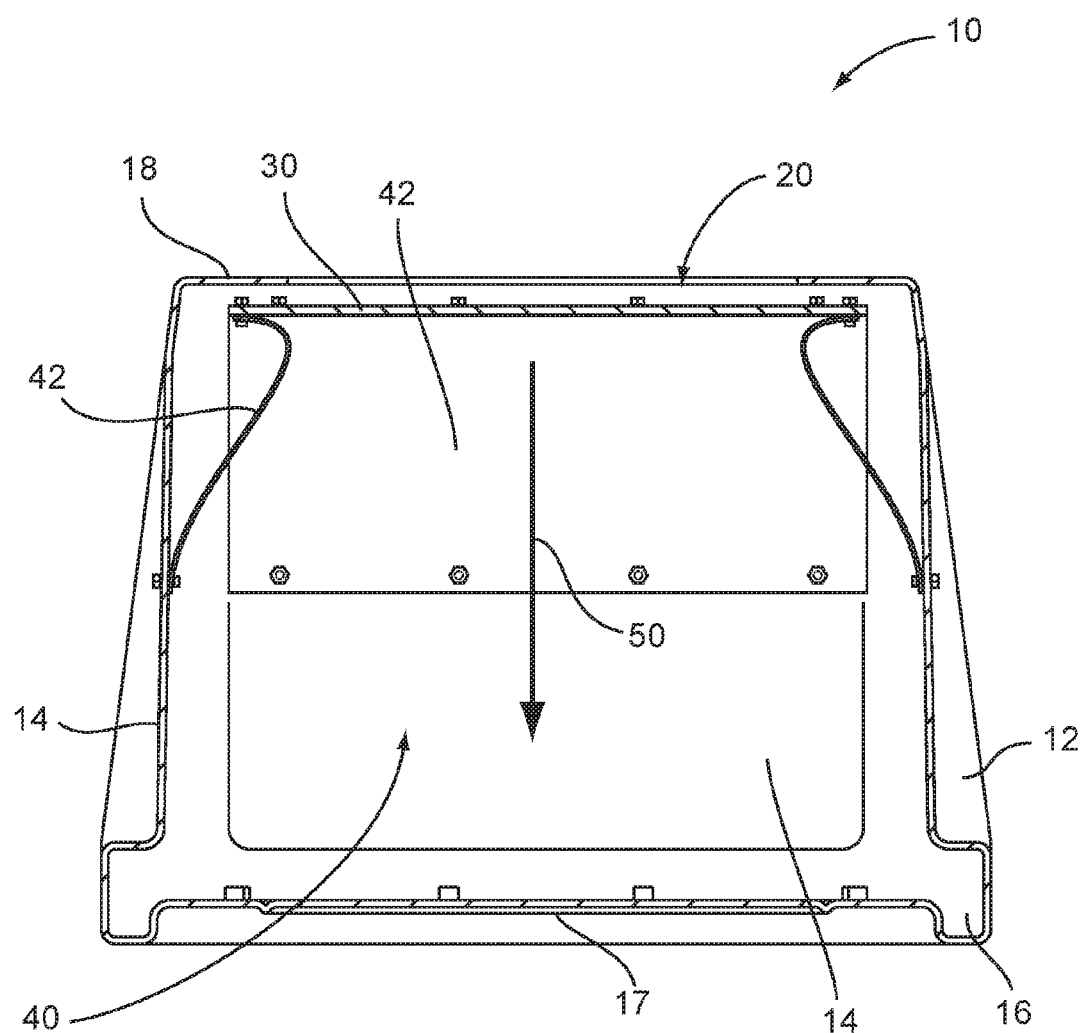
FIG. 5 is a section view of a feeding device.

The top portion 18 comprises an aperture 20, wherein aperture 20 is a feeding aperture. The consumption restriction plate 30 is operatively coupled within the inner volume 40 of the body member 12. In embodiments, the consumption restriction plate 30 is operatively coupled within the inner volume 40 by use of flexible members 42. Each flexible member 42 is coupled on one end to a side wall 14 and on the other end to the consumption restriction plate 30, as shown in FIG. 5. The flexible members 42 may be coupled to perimeter edges of the consumption restriction plate 30. The flexible members 42 allow the consumption restriction plate 30 to move up and down along directional arrow 50 hay is added and then as hay is eaten, or in other words, the consumption restriction plate moves up and down within the inner volume 40 in response to the amount hay within the inner volume 40. Further, the consumption restriction plate 30 includes a plurality of foraging apertures 32 extending through the consumption restriction plate 30. The foraging apertures 32 provide minimal amounts of hay that can be eaten through the foraging apertures 32. The foraging apertures 32 may be evenly spaced to ensure that the hay is evenly accessed by the livestock. The foraging apertures 32 may be oval in shape, round in shape, obround in shape or other similar shape. These types of shapes operate to reduce cracking in the consumption restriction plate 30 because of the lack of 90 degree angles in the apertures 32. The foraging apertures 32 are also small enough to limit the opportunity for livestock to get a foot caught in one of the foraging apertures 32. The foraging apertures 32 encourage livestock to simulate natural foraging by picking and choosing which opening they will eat from, as opposed to having their forage provided for them. Research describes how simulated foraging can lead to a calming effect, because the animal is working for their food, instead of having their forage just handed to them.

While it is shown that the consumption restriction plate 30 is rectangular in shape, thereby having four flexible members 42 coupling the consumption restriction plate 30 to the body member 12, other shapes are contemplated for the consumption restriction plate 30. For example, the consumption restriction plate 30 may be triangular, square, rectangular, pentagonal, hexagonal, and the like to correspond to the cross-sectional shapes of the body member shown in FIG. 6. In these embodiments, the number of flexible members 42 required to couple the consumption restriction plate 30 to the body member 12 is the same as the number of sides of the consumption restriction plate 30.

In operation, the moveable member 17 is moved to an open position and hay is loaded into the inner volume 40 of the body member 12. The moveable member 17 is then moved to the closed position to retain the hay within the inner volume 40. The feeding device 10 is placed on a ground surface. Because the inner volume 40 is filled with hay or other feed, the consumption restriction plate 30 is moved up to a position adjacent the top portion 18 of the body member, wherein the consumption restriction plate 30 is in close proximity to the aperture 30 of the top portion 18, and resting or floating on the hay within the inner volume 40. By floating on the hay, the consumption restriction plate 30 places foraging apertures in contact with the hay, such that pieces of hay are accessible through the foraging apertures 32. The animal may then access hay through the aperture 20 of the top portion 18 and further through foraging apertures 32 of the consumption restriction plate 30. As hay is eaten, the consumption restriction plate 30 adjusts to positions deeper within the inner volume 40 along arrow 50, but still in contact with the hay in response to the hay being eaten. The flexible members 42 operate to prevent access to the hay around sides of the consumption restriction plate within the inner volume 40 as the hay is eaten.

The flexible members 42 may provide additional benefits. For example, and without limitation, the flexible material 42 prevents the consumption restriction plate 30 from tipping unevenly and allowing free access to hay; is tough, tear resistant, weather-proof, resists staining; has separate flexible members 42 to allow for easy and inexpensive repair of just the flexible member 42 that needs replacement; allows the consumption restriction plate 30 to float evenly across the hay and does not "hang up" as a stationary guide post might; and keeps the consumption restriction plate 30 inside the feeding device 10.

The moveable member 17 also includes additional benefits. These benefits include, without limitation, allowing for a 3 step process to fill the feeding device 10 with hay without hinges or moving parts, which could possibly injure livestock or be damaged by livestock or the weather; drops down when slid into place, to prevent accidental opening; and drops down when tipped over to prevent the ability to slide the bottom open if the animal tips the feeding device 10 upside down, which would allow free access to the hay.

The bottom perimeter of the base portion 16 provides a gap between the moveable member 17 and a ground surface. This gap prevents the feeding device 10 from freezing to the ground and accumulating moisture, dirt, mud and manure.

The feeding device 10 includes many additional benefits. These benefits includes having excellent drainage, wherein water drains out the bottom sheet and sides. The animal feeds at ground level with his head down, which results in reduced chances of choking; in horses, the head down position aligns the jaw for the correct chewing motion; prevents a condition in horses called "guttural pouch" in which the horse develops an infection possibly as a result from eating with its head raised; strengthens neck muscles; and limits inhaling chaff which can lead to heaves.

Another benefit includes the animal not eating off the ground, thereby keeping the animal healthier. This includes reducing the chances of sand colic because the animal is not eating off of sandy soil; reducing parasite load because the animal is not eating directly off the ground where parasite infestation occurs; reduced bacteria ingestion from not eating near or on manure that often accumulates near the feeding area; eliminated wastage due to the animal not being able to defecate on excess hay; reduced chances of ingesting opossum dung which contains a protozoal that is the cause of most cases of EPM (Equine Protozoal Myeloencephalitis PROTOZOAL MYELOENCEPHALITIS) in horses; very little, if any, hay is wasted from being blown away by wind; is easy to load with hay for one person; allows the capability to feed 1xper day; in horses, the feeding device decreases the chance of ulcers caused by infrequent feeding resulting in an empty stomach and no forage to absorb continuously produced stomach acids; especially beneficial for livestock horses with metabolic conditions such as Cushing's, laminitis, insulin resistance and hypothyroidism, as it allows the animal to continuously forage, reducing insulin spikes.

The components defining any livestock feeding device may be formed of any of many different types of materials or combinations thereof that can readily be formed into shaped objects provided that the components selected are consistent with the intended operation of a livestock feeding device. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any livestock feeding device may be purchased pre-manufactured or manufactured separately and then assembled together. However, any or all of the components may be manufactured simultaneously and integrally joined with one another. Manufacture of these components separately or simultaneously may involve rotomolding, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A livestock feeding device comprising:
   a body member comprising a base portion, side walls and a top portion;
   an inner volume defined between the side walls, the base portion and the top portion, wherein the inner volume receives hay for feeding livestock;
   an aperture extending through the top portion to provide feeding access to the inner volume;
   a consumption restriction plate for metering the amount of hay eaten by livestock, wherein the consumption restriction plate includes perimeter edges and is adjustable up and down within the inner volume in response to the amount of hay within the inner volume; and
   flexible members, wherein each flexible member is a flexible material coupled on one end to one of the side walls of the body member and the other end of the flexible member is coupled adjacent one perimeter edge of the consumption restriction plate, and wherein each perimeter edge of the consumption restriction plate includes one flexible member coupled adjacent to it and wherein the flexible members restrict access to the hay around sides of the consumption restriction plate.

2. The device of claim 1, wherein the consumption restriction plate comprises a plurality of foraging apertures providing feeding access to the hay.

3. The device of claim 1, wherein the consumption restriction plate floats on the hay within the body member.

4. The device of claim 3, wherein the consumption restriction plate adjust deeper within the inner volume and in contact with the hay in response to the hay being eaten.

5. The device of claim 1, wherein the base portion comprises a moveable member.

6. The device of claim 5, wherein the moveable member is moveable between an opened position and a closed position.

7. The device of claim 6, wherein the inner volume is accessible through the base portion in response to moving the moveable member into the opened position.

8. The device of claim 6, wherein the inner volume is not accessible through the base portion in response to moving the moveable member into the closed position.

9. The device of claim 5, wherein the base portion forms a gap between the moveable member and a ground surface to prevent freezing of the hay.

10. A livestock feeding device comprising:
    a body member comprising a base portion, four side walls and a top portion, wherein the body member is a frusto-pyramidal shape;
    an inner volume defined between the side walls, the base portion and the top portion, wherein the inner volume receives hay for feeding livestock;
    an aperture extending through the top portion to provide feeding access to the inner volume;
    a consumption restriction plate for metering the amount of hay eaten by livestock, wherein the consumption restriction plate includes four perimeter edges and is adjustable up and down within the inner volume in response to the amount of hay within the inner volume; and
    four flexible members, wherein each flexible member is a flexible, tear resistant, weather-proof material coupled on one end to one of the side walls of the body member and the other end of the flexible member is coupled adjacent one perimeter edge of the consumption restriction plate, and wherein the four flexible members restrict access to the hay around the four perimeter edges of the consumption restriction plate for feeding livestock.

11. The device of claim 10, wherein the consumption restriction plate comprises a plurality of foraging apertures providing feeding access to the hay.

12. The device of claim 10, wherein the consumption restriction plate floats on the hay within the body member.

13. The device of claim 12, wherein the consumption restriction plate adjust deeper within the inner volume and in contact with the hay in response to the hay being eaten.

14. The device of claim 10, wherein the base portion comprises a moveable member.

15. The device of claim 14, wherein the moveable member is moveable between an opened and a closed position.

16. The device of claim 15, wherein the inner volume is accessible through the base portion in response to moving the moveable member into the opened position.

17. The device of claim 15, wherein the inner volume is not accessible through the base portion in response to moving the moveable member into the closed position.

18. The device of claim 14, wherein the base portion forms a gap between the moveable member and a ground surface to prevent freezing of the hay.

* * * * *

UNITED STATES PATENT AND TRADEMARK OFFICE
CERTIFICATE OF CORRECTION

| | | |
|---|---|---|
| PATENT NO. | : 9,668,454 B2 | Page 1 of 1 |
| APPLICATION NO. | : 14/326172 | |
| DATED | : June 6, 2017 | |
| INVENTOR(S) | : Julie Johnson | |

It is certified that error appears in the above-identified patent and that said Letters Patent is hereby corrected as shown below:

In the Claims

In Claim 4, Column 6, Line 12, the word "adjust" should read "adjusts."

In Claim 13, Column 6, Line 59, the word "adjust" should read "adjusts."

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*